United States Patent
Del Toro et al.

(10) Patent No.: US 9,951,984 B2
(45) Date of Patent: Apr. 24, 2018

(54) TANDEM COMPRESSOR REFRIGERATION SYSTEM AND A METHOD OF USING THE SAME

(71) Applicant: Carrier Corporation, Farmington, CT (US)

(72) Inventors: James J. Del Toro, Lafayette, NY (US); James E. Harris, Cato, NY (US); Marco A Quiroz, Syracuse, NY (US); Benjamen D. Baker, New Haven, IN (US); Andrew M Ramser, Fort Wayne, IN (US)

(73) Assignee: CARRIER CORPORATION, Farmington, CT (US)

( * ) Notice: Subject to any disclaimer, the term of this patent is extended or adjusted under 35 U.S.C. 154(b) by 358 days.

(21) Appl. No.: 14/264,696

(22) Filed: Apr. 29, 2014

(65) Prior Publication Data
US 2014/0345308 A1 Nov. 27, 2014

Related U.S. Application Data

(60) Provisional application No. 61/825,713, filed on May 21, 2013.

(51) Int. Cl.
*F25B 49/02* (2006.01)
*F25B 6/00* (2006.01)

(52) U.S. Cl.
CPC .............. *F25B 49/02* (2013.01); *F25B 6/00* (2013.01); *F25B 2400/0751* (2013.01); *F25B 2600/111* (2013.01); *F25B 2600/112* (2013.01); *Y02B 30/743* (2013.01)

(58) Field of Classification Search
CPC .... F25B 6/00; F25B 49/02; F25B 2400/0403; F25B 2400/0751; F25B 2600/111; F25B 2600/112; F25B 6/02; F25B 2400/06; F25B 2400/061; Y02B 30/743
USPC ...... 62/179, 180, 181, 183, 186, 196.2, 510, 62/228.5
See application file for complete search history.

(56) References Cited

U.S. PATENT DOCUMENTS

| 4,102,149 A | 7/1978 | Conley et al. |
| 5,067,326 A | 11/1991 | Alsenz |
| 5,628,201 A | 5/1997 | Bahel et al. |

(Continued)

FOREIGN PATENT DOCUMENTS

| WO | 2012145263 | 10/2012 |
| WO | 2012166338 | 12/2012 |

Primary Examiner — Marc Norman
(74) Attorney, Agent, or Firm — Cantor Colburn LLP

(57) ABSTRACT

A refrigeration system including a first compressor and a second compressor, operating in tandem, wherein the first compressor includes a compression capacity different than the compression capacity of the second compressor. A method for operating a refrigeration system including a first compressor and a second compressor operating in tandem; wherein the first compressor comprises a first compression capacity and the second compressor comprises a second compression capacity larger than the first compression capacity the method comprising the steps of: determining a cooling demand; operating the first compressor in a first stage of cooling; operating the second compressor in a second stage of cooling; and operating the first compressor and the second compressor in a third stage of cooling.

5 Claims, 2 Drawing Sheets

(56) References Cited

U.S. PATENT DOCUMENTS

| | | | |
|---|---|---|---|
| 6,196,011 B1* | 3/2001 | Bessler | F25D 17/065 62/177 |
| 6,732,539 B2 | 5/2004 | Moon et al. | |
| 7,325,414 B2 | 2/2008 | Taras et al. | |
| 7,337,624 B2* | 3/2008 | Franck | A23G 9/045 62/183 |
| 7,762,091 B2* | 7/2010 | Jin | F25B 49/022 62/175 |
| 8,287,230 B2 | 10/2012 | Hurst, Jr. et al. | |
| 2003/0230099 A1 | 12/2003 | Moon et al. | |
| 2008/0168784 A1 | 7/2008 | Choi et al. | |
| 2008/0190126 A1 | 8/2008 | Holden et al. | |
| 2008/0229764 A1* | 9/2008 | Taras | F24F 3/153 62/90 |
| 2009/0288432 A1 | 11/2009 | Lifson et al. | |
| 2010/0071391 A1 | 3/2010 | Lifson et al. | |
| 2011/0214439 A1 | 9/2011 | Lifson et al. | |
| 2011/0314845 A1 | 12/2011 | Lifson et al. | |

\* cited by examiner

TANDEM COMPRESSOR REFRIGERATION SYSTEM AND A METHOD OF USING THE SAME

CROSS REFERENCE TO RELATED APPLICATIONS

The present application is related to, and claims the priority benefit of, U.S. Provisional Patent Application Ser. No. 61/825,713 filed May 21, 2013, the contents of which are hereby incorporated in their entirety into the present disclosure.

TECHNICAL FIELD OF THE DISCLOSED EMBODIMENTS

The presently disclosed embodiments generally relate to refrigeration systems, and more particularly, to a tandem compressor refrigeration system and a method for using the same.

BACKGROUND OF THE DISCLOSED EMBODIMENTS

Heating, ventilation, air conditioning and refrigeration ("HVAC&R") systems typically include a compressor delivering a compressed refrigerant from a compressor discharge port to a condenser. The refrigerant is then passed from the condenser to an expansion device, from the expansion device to an evaporator, and finally back to the compressor suction port throughout a closed-loop circuit. The thermal load demand on the HVAC&R system may vary and generally depends on a variety of factors including, but not limited to, indoor and outdoor operational environments, thermal load generation in a conditioned space and fresh air circulation requirements for example. At times, there may be a need for a higher system cooling capacity, and hence higher flow of refrigerant circulating throughout the HVAC&R system is required. At other times, a lower cooling capacity, and consequently a lower refrigerant flow, may be adequate to maintain the conditioned space within the comfort zone. To provide sufficient means of refrigerant flow control, some HVAC&R systems use tandem compressors having the same compressor displacement to provide unloading capability by switching off one of the tandem compressors to match the system capacity to the thermal load in the conditioned space. In such systems, the two or more tandem compressors may simultaneously deliver a compressed refrigerant to a downstream heat exchanger, such as a condenser.

Tandem compressor systems are known, wherein separate condensers are associated with each of the compressors, while the compressors are still connected to the same evaporator. Analogously, tandem compressor systems may be connected to separate evaporators, while still being configured to communicate with the same condenser. The last two configurations are typically utilized when either the condensers or evaporators are associated with separate indoor or outdoor environments that may have different operational characteristics. A control for a typical tandem compressor system will operate one or multiple compressors, depending on the system thermal load. Thus, the compressors can be controlled to provide discrete steps in system capacity to optimize system performance at a full load capacity. Alternatively, the system capacity of a tandem compressor system may be varied by using a compressor unloading function. One commonly employed compressor unloading function may selectively deliver at least a portion of partially or fully compressed refrigerant back to a suction line. In this manner, the amount of compressed refrigerant delivered through the HVAC&R system is reduced when a part-load capacity is demanded. However, a tandem compressor system may not yield optimal performance under partial load conditions, because one of the compressors delivers at least a portion of compressed refrigerant back to a suction line, thus wasting the energy used to compress that portion of refrigerant. There is therefore a need for a refrigeration system that can optimize system performance under full load and partial load conditions.

SUMMARY OF THE DISCLOSED EMBODIMENTS

In one aspect, a refrigeration system with a first compressor and a second compressor configured to operate independently or in tandem is provided. The refrigeration system includes a first compressor, including a first compression capacity, operably coupled to a second compressor, including a second compression capacity, wherein the first compression capacity is different than the second compression capacity.

In another aspect, the refrigeration system further includes a first heat exchanger and a second heat exchanger operably coupled to the first compressor and the second compressor. The refrigeration system includes a third heat exchanger operably coupled to the first and second heat exchangers, and a fourth heat exchanger operably coupled to the third heat exchanger and the first and second compressors. The refrigeration system includes an outdoor fan to circulate air across one or both of the first heat exchanger and the second heat exchanger. In one embodiment, the outdoor fan operates at a plurality of distinct speeds, such as three or more speeds. The refrigeration system includes an indoor fan to circulate air across the fourth heat exchanger. In one embodiment, the indoor fan operates at a plurality of distinct speeds, such as three or more speeds.

In one aspect, a method for operating a refrigeration system including a first compressor and a second compressor configured to operate independently or in tandem; the first compressor having a first compression capacity and the second compressor having a second compression capacity, the second compression capacity being larger than the first compression capacity. The method includes the step of determining a cooling demand. The method further includes the step of operating the first compressor in a first cooling mode if the compression capacity of the cooling demand is less than or equal to the compression capacity of the first compressor. The method also includes the step of operating the second compressor in a second cooling mode if the compression capacity of the cooling demand is greater than the compression capacity of the first compressor and less than or equal to the compression capacity of the second compressor. The method also includes the step of operating both the first compressor and the second compressor in a third cooling mode if the compression capacity of the cooling demand is greater than the compression capacity of the second compressor.

In one embodiment, the method further includes the first compressor and the second compressor operably coupled to a first heat exchanger and a second heat exchanger; wherein an outdoor fan is configured to circulate air across the first and second heat exchangers; wherein a third heat exchanger is operably coupled to the first and second heat exchangers; wherein a fourth heat exchanger is operably coupled to the third heat exchanger; an indoor fan is configured to circulate air across the fourth heat exchanger; and a control is in electrical communication with the first compressor, the second, the outdoor fan and the indoor fan.

In one embodiment, the first cooling mode further includes operating at least one or both of the outdoor fan and the indoor fan at a first speed. In one embodiment, the selected first speed of the outdoor fan and indoor fan may generally be a low speed.

In one embodiment, the second cooling mode further includes operating at least one or both of the outdoor fan and the indoor fan at a second speed. In one embodiment, the selected second speed of the outdoor fan and indoor fan may generally be a medium speed.

In one embodiment, the third cooling mode further includes operating at least one or both of the outdoor fan and the indoor fan at a third speed. In one embodiment, the selected third speed of the outdoor fan and the indoor fan may generally be a high speed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
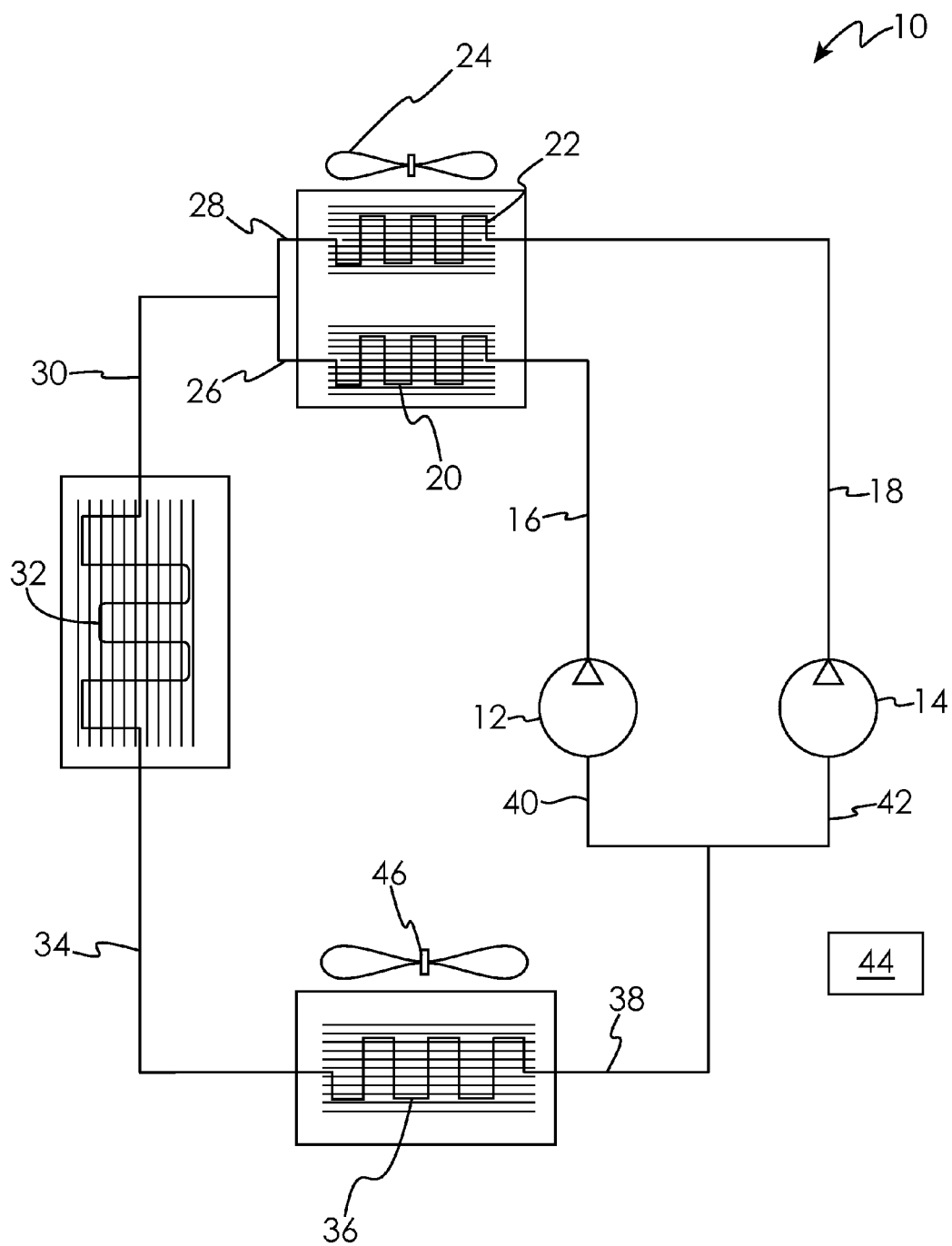
FIG. 1 is a schematic diagram of a refrigeration system including a first compressor and a second compressor operating in tandem according to an embodiment of the invention.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a refrigeration system in an exemplary embodiment, indicated generally at 10. Particularly, the refrigeration system 10 includes a first compressor 12, having a first compression capacity, operably coupled to a second compressor 14, having a second compression capacity, such that the first compressor 12 and the second compressor 14 are configured to operate in tandem. In one embodiment, the first compression capacity is different than the second compression capacity. In a conventional configuration, the tandem compressors 12 and 14 have common suction and common discharge manifolds (not shown), as known to a person ordinarily skilled in the art. Alternatively, the tandem compressors 12 and 14 may have a common suction manifold and separate discharge lines, as illustrated in FIG. 1, or may have separate suction lines and a common discharge manifold.

The illustrated refrigeration system 10 further includes a conduit 16 coupled to a discharge output of the first compressor 12, and a conduit 18 coupled to a discharge output of the second compressor 14. In one embodiment, the conduit 16 is coupled to one end of a first heat exchanger 20, and the conduit 18 is coupled to one end of a second heat exchanger 22 to allow a refrigerant to flow therethrough. The refrigeration system 10 includes an outdoor fan 24 configured to circulate air across one or both of the first heat exchanger 20 and the second heat exchanger 22. In one embodiment, the outdoor fan 24 operates at a plurality of distinct speeds, such as three or more speeds for example. A conduit 26 may be coupled to the other end of the first heat exchanger 20, and a conduit 28 may be coupled to the other end of the second heat exchanger 22. Conduits 26 and 28 may be joined to form a conduit 30. The conduit 30 may be coupled to one end of a third heat exchanger 32 to allow a refrigerant to flow therethrough. In one non-limiting embodiment, the third heat exchanger 32 is an economizer. The third heat exchanger 32 may be included in the refrigeration system 10 to reduce energy consumption by using cool outside air as a means of cooling the indoor space. The other end of the third heat exchanger 32 may be coupled to one end of a fourth heat exchanger 36 via a conduit 34. The refrigeration system 10 includes an indoor fan 46 to circulate air across the fourth heat exchanger 36 to condition the air provided to an interior space. In one embodiment, the indoor fan 46 is configured to operate at a plurality of distinct speeds. The other end of the fourth heat exchanger 36 is operably coupled to a suction input of the first compressor 12 via a conduit 38 and a conduit 40. The other end of the fourth heat exchanger 36 is also operably coupled to a suction input of the second compressor 14 via the conduit 38 and a conduit 42. The refrigeration system 10 further includes a controller 44 operably coupled to the first compressor 12, the second compressor 14, the outdoor fan 24, and the indoor fan 46 to control operation thereof, such as through electrical communication.

Figure 2:
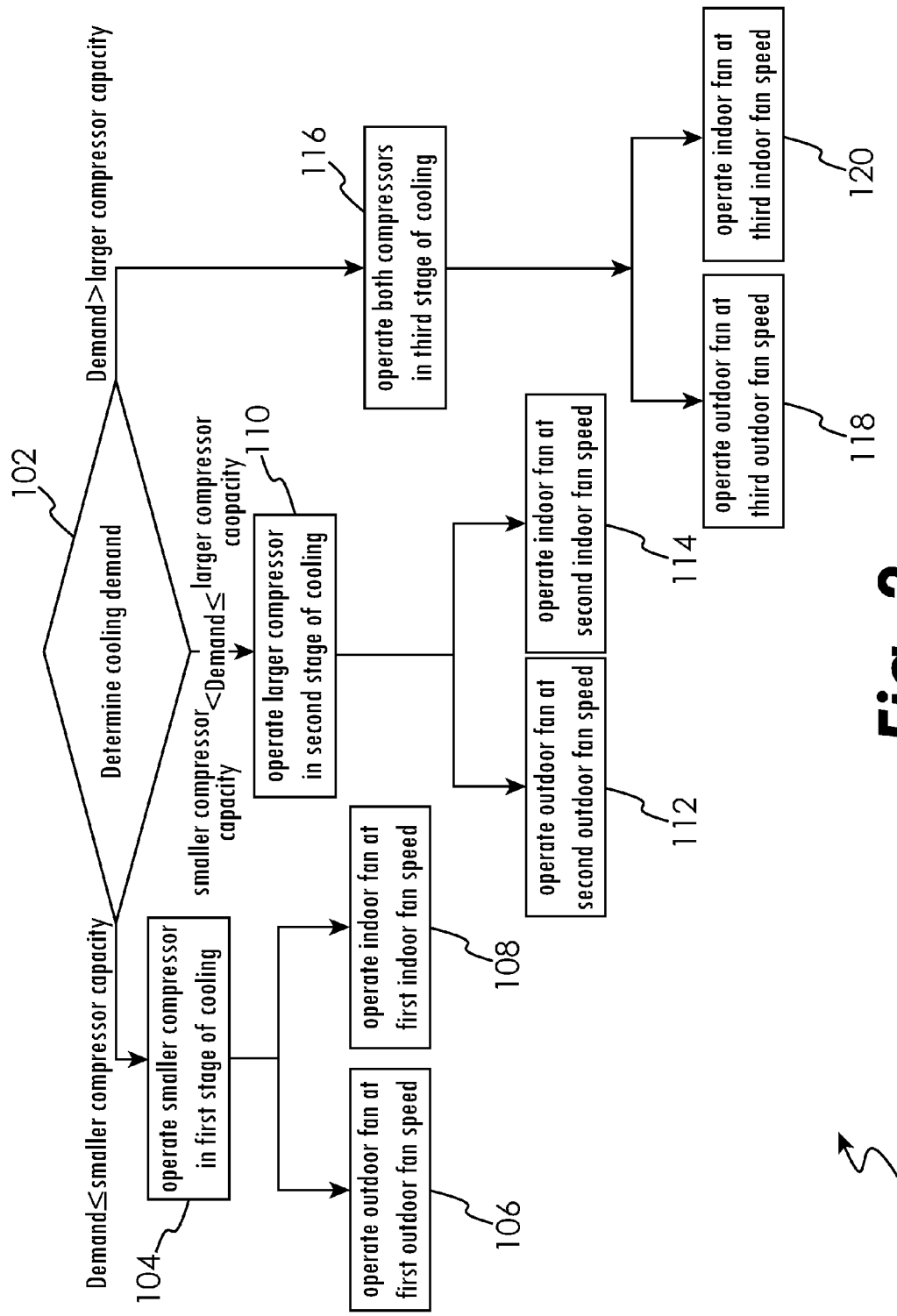
FIG. 2 is a schematic flow chart of a method for utilizing a refrigeration system including a first compressor and a second compressor operating in tandem according to an embodiment of the invention.

FIG. 2 illustrates an example of a method 100 of operating a refrigeration system 10 including a first compressor 12 and a second compressor 14 arranged in tandem and each having distinct compression capacities. In one embodiment, the compression capacity of the first compressor 12 is less than the compression capacity of the second compressor 14.

The method includes step 102 of determining the cooling demand of an interior space to be conditioned. In one non-limiting embodiment, the controller 44 is configured to receive signals, such as from a sensor (not shown) arranged in an interior space for example, to determine a cooling demand for the interior space. A cooling demand generally occurs when the temperature of the interior space, such as measured by the sensor (not shown), is greater than a desired, predetermined temperature, such as selected using a thermostat.

If the compression capacity required to satisfy the cooling demand is less than or equal to the compression capacity of the first compressor 12, the first compressor 12 operates in a first cooling mode, as shown in step 104. The first cooling mode further includes operating at least one or both of the outdoor fan 24 and the indoor fan 46 at a first speed thereof, as shown respectively in steps 106 and 108. In one embodiment, the selected first speed of the outdoor fan 24 or the first speed of the indoor fan 46 is generally a low speed.

In embodiments where the cooling demand may be satisfied by a compression capacity less than or equal to the compression capacity of the first compressor 12, the controller 44 commands the first compressor 12 to operate. As the compressed refrigerant exits the first compressor 12, it flows through the conduit 16 to the first heat exchanger 20. As the refrigerant flows through the first heat exchanger 20, the outdoor fan 24 operates at a first outdoor fan speed to circulate air across the first heat exchanger 20, transferring heat from the refrigerant into the cooler ambient air. The refrigerant exits the first heat exchanger 20 through the conduits 26 and 30, to the third heat exchanger 32; then to the fourth heat exchanger 36 via the conduit 34. As the refrigerant flows through the fourth heat exchanger 36, the indoor fan 46 operates at a first indoor fan speed to circulate air across the fourth heat exchanger 36 to cool the air and to distribute the cooled air to a building through a duct (not shown). The refrigerant completes the circuit by returning to the first compressor 12 via the conduits 38 and 40. Operation of the first compressor 12 when the cooling demand may be satisfied by a capacity less than or equal to the compression capacity of the first, smaller compressor 12 is more efficient than operating the second, larger compressor 14. Thus, the partial cooling demand of the interior space is met more efficiently than if both compressors 12, 14 had the larger capacity of the second compressor 14.

If the compression capacity needed to satisfy the cooling demand of the interior space is greater than the compression capacity of the first compressor 12, but less than or equal to the compression capacity of the second compressor 14, the method proceeds to step 110 of operating the second compressor 14 in a second cooling mode. The second cooling mode further includes at least one of step 112 of operating the outdoor fan 24 at a second outdoor fan speed or step 114 of operating the indoor fan 38 at a second indoor fan speed. In one embodiment, the selected second speed of the outdoor fan 24 or the second speed of the indoor fan 46 is generally a medium speed.

In embodiments where the compression capacity required to satisfy the cooling demand of the interior space is greater than the compression capacity of the first compressor 12, but less than or equal to the compression capacity of second compressor 14, the controller 44 commands the second compressor 14 to operate. As the compressed refrigerant exits the second compressor 14, it flows through the conduit 18 to the second heat exchanger 22. As the refrigerant flows through the second heat exchanger 22, the outdoor fan 24 operates at a second outdoor fan speed to circulate air across the second heat exchanger 22 transferring heat from the refrigerant into the cooler ambient air. The refrigerant exits the second heat exchanger 22 through the conduits 28 and 30, to the third heat exchanger 32; then to the fourth heat exchanger 36 via the conduit 34. As the refrigerant flows through the fourth heat exchanger 36, the indoor fan 46 operates at a second indoor fan speed to circulate air across the fourth heat exchanger 36 to cool the air and to distribute the cooled air to a building through a duct (not shown). The refrigerant completes the circuit by returning to the second compressor 14 via the conduits 38 and 42. Operation of the second compressor 14 when the cooling demand may be satisfied by a capacity greater than the smaller compressor 12, but less than or equal to the larger compressor 14 is more efficient than operating both compressors 12, 14. Thus, the partial cooling demand of the interior space is met more efficiently than if both compressors 12, 14 had the same compression capacity.

If the compression capacity required to satisfy the cooling demand of the interior space is greater than the compression capacity of the second compressor 14, the method proceeds to step 116 of operating both the first compressor 12 and the second compressor 14 in a third cooling mode. In one embodiment, the third cooling mode further includes at least one of either step 118 of operating the outdoor fan 24 at a third outdoor fan speed, and step 120 of operating the indoor fan 38 at a third indoor fan speed. In one embodiment, the selected third speed of the outdoor fan 24 and the selected third speed of the indoor fan 46 are generally a high speed.

In embodiments where the compression capacity required to satisfy the cooling demand is greater than the compression capacity of the second compressor 14, the controller 44 commands both the first compressor 12 and the second compressor 14 to operate. As the compressed refrigerant exits the first compressor 12 and the second compressor 14, it flows through the conduits 16 and 18 to the first heat exchanger 20 and the second heat exchanger 22, respectively. As the refrigerant flows through the first heat exchanger 20 and the second heat exchanger 22, the outdoor fan 24 operates at a third outdoor fan speed to circulate air across the first heat exchanger 20 and the second heat exchanger 22, thereby transferring heat from the refrigerant into the cooler ambient air. The refrigerant exits the first heat exchanger 20 and the second heat exchanger 22 through the conduits 26, 28 and 30, to the third heat exchanger 32, then to the fourth heat exchanger 36 via the conduit 34. As the refrigerant flows through the fourth heat exchanger 36, the indoor fan 46 operates at a third indoor fan speed to circulate air across the fourth heat exchanger 36 to cool the air and to distribute the cooled air to a building through a duct (not shown). The refrigerant completes the circuit by returning to the first compressor 12 and the second compressor 14 via the conduits 38, 40 and 42.

It will be appreciated that, because the first compressor 12 and the second compressor 14 have different compressor displacements, they may be operated independently to maximize the partial load efficiency of the refrigeration system 10. It will also be appreciated that the outdoor fan 24 and the indoor fan 46 may operate at different speed levels to match the three compression capacities provided by the first compressor 12 and the second compressor 14 to enhance the partial load efficiency of the refrigeration system 10.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A refrigeration system comprising:
 a first compressor having a first compression capacity;
 a second compressor having a second compression capacity, the second compression capacity being different from the first compression capacity, wherein the second compressor is operably coupled to the first compressor such that the first compressor and the second compressor are configured to operate either independently or in tandem;
 a first heat exchanger operably coupled to the first compressor, the first heat exchanger not operably coupled to the second compressor;
 a second heat exchanger operably coupled to the second compressor, the second heat exchanger not operably coupled to the first compressor;
 an outdoor fan configured to circulate air across the first and second heat exchangers; and
 a control operably coupled to the first compressor, the second compressor, the outdoor fan and an indoor fan;
 the refrigeration system having an operating compression capacity, the operating compression capacity being the sum of compression capacities of operating compressors including the first compressor and the second compressor; and wherein the control is configured to vary the operating compression capacity by operating the first and second compressors either independently or in tandem, and wherein when the first compressor is operating and the second compressor is not operating, the control is configured to operate the outdoor fan and the indoor fan at a first speed, when the second compressor is operating and the first compressor is not operating, the control is configured to operate the outdoor fan and the indoor fan at a second speed greater than the first speed, and when the first compressor and the second compressor are operating in tandem, the control is configured to operate the outdoor fan and the indoor fan at a third speed greater than the first speed and greater than the second speed.

2. The refrigeration system of claim 1 further comprising: a third heat exchanger operably coupled to the first and second heat exchangers; a fourth heat exchanger operably coupled to the third heat exchanger;

the indoor fan configured to circulate air across the fourth heat exchanger.

3. The refrigeration system of claim 2, wherein the indoor fan comprises a first plurality of fan speeds and the outdoor fan comprises a second plurality of fan speeds.

4. The refrigeration system of claim 3, wherein each of the first plurality of fan speeds and the second plurality of fan speeds includes three distinct fan speeds.

5. The refrigeration system of claim 2, wherein the control is configured to communicate electrically with the first compressor, the second compressor, the outdoor fan and the indoor fan.

* * * * *